Sept. 18, 1962
A. J. WILLIAMS
3,054,420
RELIEF VALVES
Filed Oct. 3, 1958
2 Sheets-Sheet 1
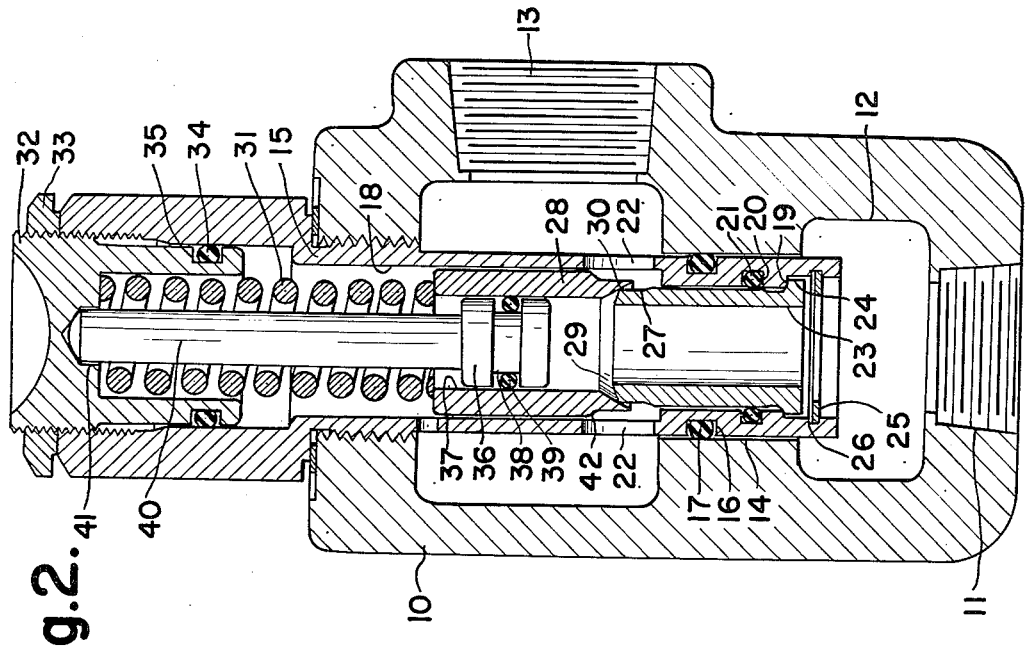
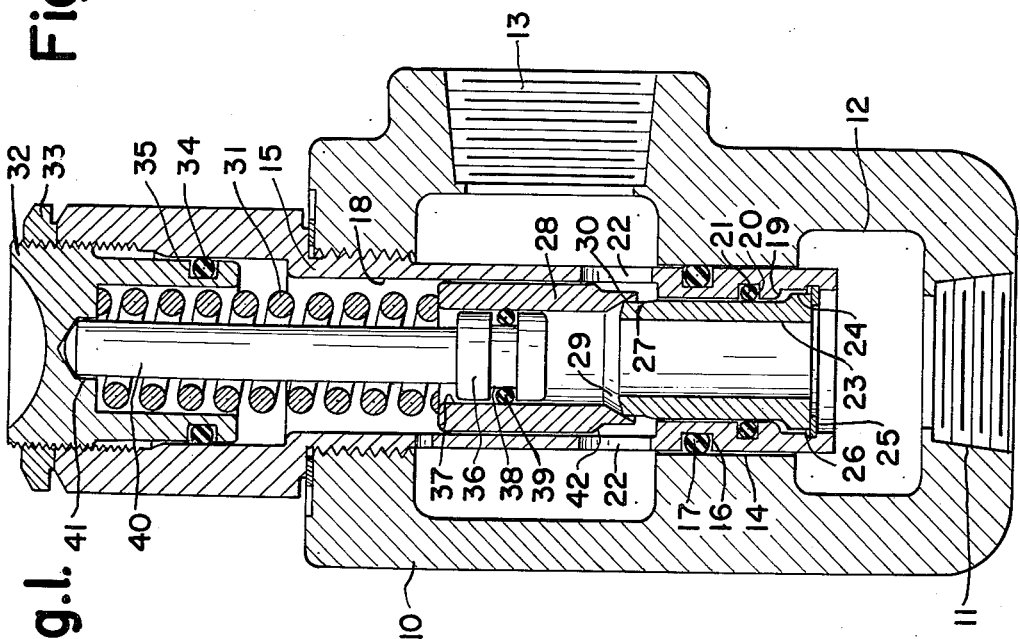
INVENTOR.
Arthur James Williams
BY *Hooper Leonard & Buell*
his attorneys.

Sept. 18, 1962  A. J. WILLIAMS  3,054,420
RELIEF VALVES
Filed Oct. 3, 1958  2 Sheets-Sheet 2
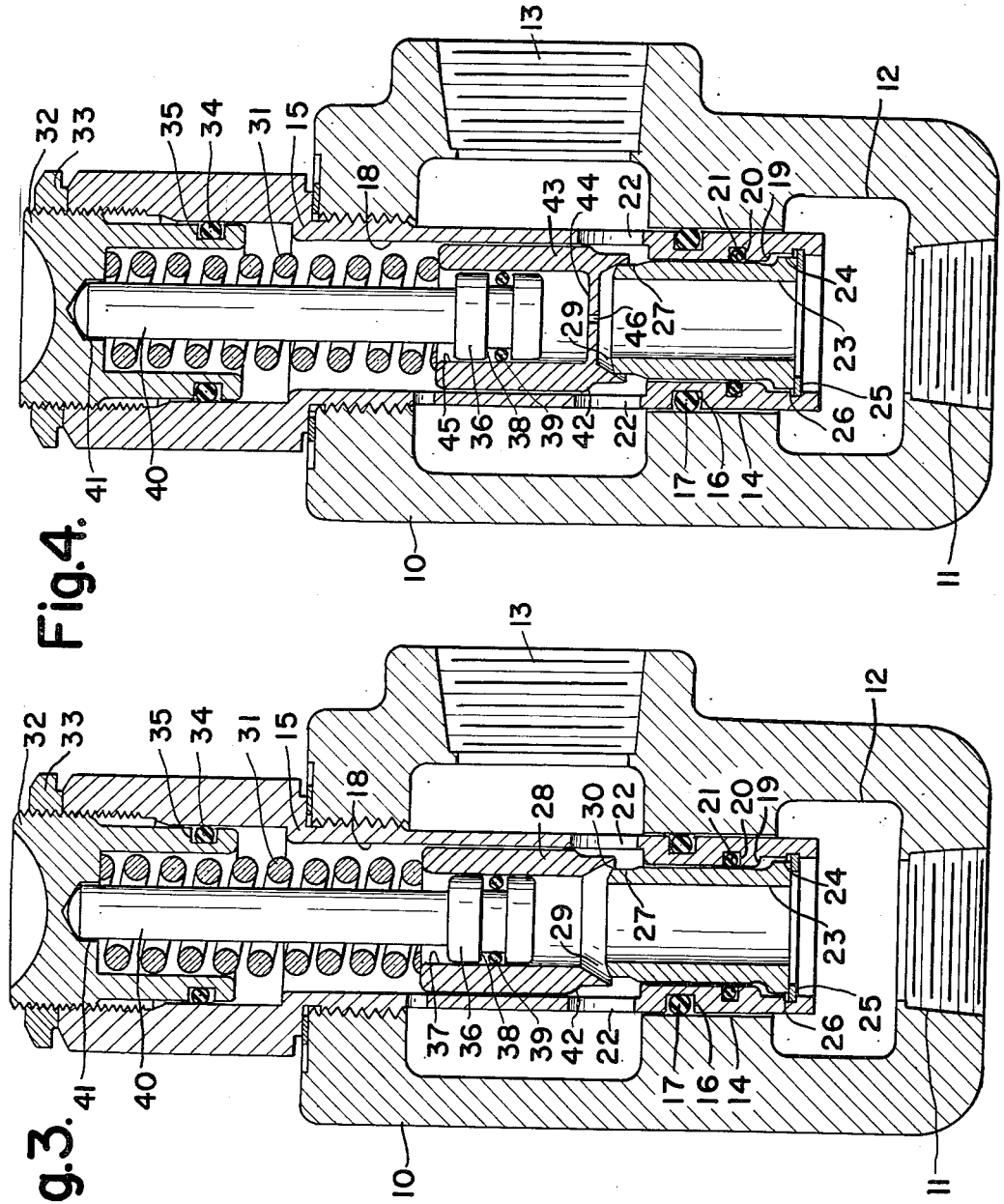
INVENTOR.
Arthur James Williams
BY *Hooper, Leonard & Buell*
his attorneys.

3,054,420
RELIEF VALVES
Arthur James Williams, Hubbard, Ohio, assignor to
The Commercial Shearing & Stamping Co.
Filed Oct. 3, 1958, Ser. No. 765,132
4 Claims. (Cl. 137—469)

This invention relates to relief valves and more particularly a relief valve for mobile equipment.

It has long been the practice to protect hydraulic circuits by relief valves in both the so called "industrial" and "mobile" fields. In both the industrial and the mobile fields the hydraulic pump which delivers the hydraulic fluid under pressure is driven by the prime mover and operates at a speed of rotation that has a fixed relationship to the speed of rotation of the motor. In the industrial field the motor usually operates at a fixed speed whereas in the mobile field (earth moving equipment, etc.) the speed of rotation is variable within a wide range governed by the pressure of the operator's foot on the throttle. The delivery of oil in gallons per minute to the oil circuit is directly proportional to the speed of rotation of the motor. Thus the delivery of oil in industrial installations is usually constant whereas in the mobile field the delivery of oil varies over a wide range. As a consequence when the relief valve opens in an industrial installation with the motor operating at constant speed the pressure on the circuit remains constant because the volume remains constant. In the mobile field, however, the tendency is for the pressure to show a marked increase because of the normal tendency of an operator to accelerate the motor when the relief valve opens.

To illustrate this usual occurrence in the mobile field, assume a back hoe digging a ditch or trench. Ordinarily, the operator will be digging at about three-quarters of the normal speed of the diesel engine that powers his unit. The blade encounters a boulder firmly embedded in the earth and, so far as the back hoe is concerned, it is immovable. The relief valve opens. The natural thing for the operator to do is to press down harder on the accelerator pedal. In so doing he increases the speed of the motor, thereby increases the speed of the pump, and thereby increases the rate of oil delivery from the pump to the hydraulic circuit. As he increases the speed of the motor the pressure in the hydraulic circuit goes up due to the increased volume of oil that must pass through the relief valve. Ordinarily, relief valve balls or poppets are held in their seat in a closed position by a spring. As the volume of oil that must pass through the relief valve increases, additional space between the poppet and its seat to pass the increased volume of oil, becomes available by the oil itself compressing the spring that urges the poppet to its seat. But, in order to compress the spring further than it was initially compressed, the pressure must be increased. In actual practice the step up in pressure in the hydraulic circuit after the relief valve pops, and when the operator steps further on the accelerator pedal, may amount to several hundred pounds. Thus, a relief valve set for 1600 pounds for normal operating speed may actually go up to 1900 pounds at top motor speed. This sudden increase in pressure may do serious damage to the hydraulic equipment as well as to the machine itself.

Another undesirable characteristic of ordinary relief valves is their tendency to "dribble" at a pressure considerably below the release pressure. To illustrate this let us assume that the operator is operating the same back hoe referred to above. His relief valve is set to pop at 1600 pounds. Let us assume further that he is operating in ground where 1200 pounds will normally dig the ground, and lift the bucket with its normal load, up to dump it in the truck. If this back hoe is equipped with a normal ordinary relief valve, the relief valve will begin to pass oil at some pressure considerably below the pop pressure. Let us assume 1350 p.s.i. This passage of oil prior to the pop pressure, is called "dribble." The rate of dribble increases with pressure up to the pop pressure of, say, 1600 pounds. Let us now assume that the operator encounters a boulder. He opens the throttle and the boulder is dislodged and enters the bucket. The load in the bucket now is considerably greater than normal and calls for a pressure of around 1500 pounds to raise the bucket. The bucket goes up but very slowly. This is because the oil now has two places to go. Part of the oil dribbles past the relief valve and so back to the reservoir. The rest of the oil goes to the lifting cylinder. Naturally, this situation is irksome to the operator, and to the equipment owner, because it takes a longer time to bring the load up to the dumping position and thereby increases the cycle time.

Most relief valves have another undesirable characteristic, that is screaming or chattering when oil passes through the valve. This is not only objectionable because of the noise but also because of the damage done to the seat by the poppet or ball hammering its seat to cause the noise.

Various relief valves have been proposed to overcome one or more of these objectionable features of the ordinary relief valve. For example, various types of pilot operated relief valves have been proposed. However, all of these valves have at least one fatal weakness. That weakness is the time element. When in the operation of the equipment, an obstruction is encountered that is absolutely immovable the relief valve must pass the full volume of oil instantly. All of the pilot operated relief valves that have been heretofore proposed, have so far as I am aware, required some fraction of a second to open the valve prior to passage of the full volume of the oil. In that infinitesimal period of time the pressure of the circuit can go to fantastic heights and some component of the hydraulic circuit is quite apt to rupture by the shock. Not infrequently, it is the pump itself that fails due to the overload.

I have invented a relief valve particularly suited for mobile applications but usable in a place where a normal relief valve is used. The relief valve of my invention will maintain the pressure substantially constant within the range of the particular unit, regardless of speed or volume encountered. The valve is set, for example, at 1600 lbs. and passes oil at 1600 lbs. whether the operator steps on the accelerator pedal or not. The dribble point on my valve is within a few pounds of the open pressure and is in effect substantially the same as the open pressure. Moreover, the relief valve of my invention is quiet and free from screaming or chattering in operation. Another important feature of the valve of my invention is the ability, when desired, to reduce the pressure on the entire system when the valve opens.

I provide a relief valve having an inner and an outer chamber separated by the dividing wall having openings therethrough communicating between the chambers, said inner chamber communicating with and being under constant pressure from the hydraulic system, shoulder means in the inner chamber adjacent the openings in the sidewall, seat means movable in the inner chamber across the openings in the wall thereof, said seat means having a face adapted to seat on the shoulder in sealing relationship, said face sloping from the inner chamber toward the wall thereof in a direction adapted to cause a change in direction of fluid flow greater than 90° from the inner chamber to the outer chamber and resilient means urging the seat means normally against the shoulder in sealing relationship therewith. Preferably, the shoulder in the inner chamber is in the form of a sliding poppet having limited movement in said inner chamber in the direction of movement of the seat. A piston is preferably provided in the seat over which the seat is movable to reduce the active area of said seat upon which the fluid is operable.

While certain salient features, advantages, purposes and objects of my invention have been set out hereinabove, other objects, advantages and purposes will be apparent from a consideration of the following description and the accompanying drawings in which, FIGURE 1 is a longitudinal section through the valve of my invention in the normally closed position;

FIGURE 2 is a longitudinal section through the valve of FIGURE 1 showing the valve position just prior to opening;

FIGURE 3 is a longitudinal section of the valve of FIGURE 1 showing the valve in the open position; and FIGURE 4 is a longitudinal section through a second embodiment of my valve.

Referring to the drawings, I have illustrated a housing 10 having an inlet opening 11 adapted to be connected to the hydraulic system which is to be relieved. The housing 10 is provided with an inlet chamber 12 and an outlet chamber 13 spaced apart along a central bore 14. A valve cartridge 15 is adapted to fit into the central bore 14 and to threadingly engage the end of the bore opposite the inlet 11. The cartridge 15 is provided with a recess 16 carrying an O-ring seal 17 which seals the cartridge to the inner bore 14 between the inlet chamber 12 and the outlet chamber 13. The cartridge 15 is provided with an axial bore 18 having an inwardly extending annular member 19 in the portion lying between the inlet chamber and the outlet chamber. This annular portion 19 is provided with a recess 20 receiving an O-ring seal 21 whose function will be more specifically described later. The cartridge 15 is provided with passages 22 which open through the sidewalls into the outlet chamber 13 of the housing 10. A floating poppet 23 is slidably mounted in the bore of the cartridge 15 within the annular member 19 for axial movement in the bore. The poppet 23 is sealed to the annular member 19 by the O-ring 21. The floating poppet 23 is provided with a shoulder portion 24 which is adapted to abut the edge of the annular member 19 and be limited in its axial movement thereby. A snap ring 25 is placed in a groove 26 in the end of the cartridge 15 adjacent the inlet chamber 12 and is spaced from the annular member 19 a distance sufficient to permit axial movement of the shoulder 24 and thereby limit axial movement of the poppet 23. The end of the floating poppet 23 opposite the flange 24 is provided with a reduced shoulder portion 27. A floating seat 28 in the form of a hollow cylinder is slidable in the bore 18 of the cartridge 15 adjacent the outlet openings 22 through the wall thereof. The floating seat is provided with a frusto conical opening 19 which receives the portion 27 of the floating poppet so that the edge 30 is in contact with the inner wall of the frusto conical opening 29 to form a knife edge contact. A spring 31 bears against the end of the floating seat opposite frusto conical opening 29 and urges the seat into tight contact with the edge 30 of the floating poppet. The spring 30 is held in place by a closure member 32 threaded into the bore 18 of the cartridge and held locked thereto by locknut 33. An O-ring seal 34 is provided in an annular groove 35 in the locking member 32 to seal the locking member to the wall of the bore 18. A piston 36 is provided in the bore 37 of the floating seat 28. The piston 36 is provided with an annular groove 38 receiving an O-ring 39 which seals the piston in the bore. A stem 40 forming a part of the piston extends through the central axis of the spring 31 and engages an opening 41 in the locking member 32 so as to hold the piston and limit its movement.

The operation of the relief valve of this invention is as follows:

At low hydraulic pressures the floating seat 28 is urged against the floating poppet 23 by the spring 31 which in turn forces the poppet 23 against the snap ring 25. The pressure of the fluid holds the piston 36 in position within the floating seat 28 with the stem 40 in the opening 41 of the locking member 32. When pressure increases in the inlet chamber 12 it acts on the exposed end of the floating poppet and on the floating seat over the exposed area of the frusto conical opening 29 between the edge 30 of the floating poppet and the inner bore 37 of the floating seat. Upon a sufficient increase in pressure the poppet moves away from the snap ring 25 and the spring 31 is compressed. At this point both the poppet and the seat are floating but are in sealing engagement along the edge 30 by reason of the pressure acting on the end of the poppet. As the pressure increases, the poppet moves away from the snap ring until the flange 24 of the poppet strikes the annular member 19 at which time the poppet is mechanically restrained from further movement and from further compressing the spring 31. Up until this point, the hydraulic fluid in the inlet chamber 12 has remained in the static condition. A further slight increase in pressure causes the floating seat 28 to move away from the poppet 23 and to further compress the spring 31. At this point oil will flow around the end of the floating poppet between the poppet and the floating seat. Immediately the area subject to oil pressure on the floating seat increases as shown in FIGURE 3 and the hydraulic fluid changes direction following the surface of the frusto conical opening 29. In changing direction an increased force is exerted on the floating seat to compress the spring 31. This effect is similar to the force exerted in the vanes of a hydraulic turbine and will vary depending upon the deflection angle formed by the frusto conical opening 29. In addition the pressure on the floating seat is increased by the pressure of the fluid in the outlet chamber acting on the shoulder 42 of the seat surrounding the frusto conical opening 29. If the volume is now increased as is the usual case in mobile installations when the operator accelerates the motor, the floating poppet and the floating seat will separate still further to increase the area of the annular orifice between them. The increased volume of oil turning the sharp corner formed by the opening 29 exerts an increased turbine effect on the seat to compress the spring 31 still more, which again increases the area upon which the hydraulic fluid acts. Accordingly, it will be seen that increases in volume produce increased turbined effects, increased area of action on the floating seat without any increase in the circuit pressure. This is precisely contrary to the well recognized effect that an increased volume has on the conventional ball type relief valve.

Referring to FIGURE 2, it will be seen that just prior to opening the floating poppet is in contact with the floating seat so that there is no flow of hydraulic fluid. Therefore, there is no "dribble." In contrast to this, it is known that in conventional ball type relief valves there is a considerable period of dribble in which the flow increases from a point several hundred pounds below the opening pressure up to as much as 25% of flow just before the valve opens.

In the embodiment shown in FIGURE 4, a floating seat 43 having a diaphragm 44 extending across the central bore 45 is substituted for the floating seat 28. The diaphragm is provided with an opening 46 on the axis of the seat which permits fluid to flow between the diaphragm and the end of the piston 36. This acts as a damper in controlling relative movement of the floating seat with respect to the piston 36. While proper proportioning of the parts in the structure illustrated in FIGURES 1 through 3 will avoid any chance of chatter, the structure shown in FIGURE 4 provides a further safeguard and is an alternative for the floating seat 28 of FIGURES 1 through 3.

It will be recognized that the valve structure of this invention need not be mounted in a cartridge as illustrated but could be mounted in any other appropriate housing. It will also be evident that the positions of the floating seat and floating poppet could be reversed.

While I have illustrated and described a present preferred form of the invention, it is to be understood that the invention is not limited thereto but may be otherwise embodied within the scope of the following claims.

I claim:

1. A relief valve comprising a housing having a cylindrical bore having an annularly reduced portion adjacent one end forming an inner bore, an outer chamber surrounding said bore adjacent one end of the annularly reduced portion and separated by a dividing wall, said dividing wall having openings therethrough communicating between the bore and said chamber adjacent one end of the inner bore, an inlet in said bore communicating with a source of hydraulic fluid under pressure adjacent the end of the inner bore opposite said openings, a hollow cylindrical poppet member in the inner bore movable through the inner bore, said poppet member having an outwardly extending flange engaging the bore wall and adapted for limited movement between the end of the inner bore and the inlet in the bore, stop means in the bore adjacent the inlet spaced from the inner bore acting to limit the movement of the poppet flange, seat means movable in the inner bore across the openings in the wall thereof, said seat means being a hollow cylindrical member having a central bore, and piston means in said central bore in sealing engagement therewith over which said seat means is adapted to move, said piston means acting to limit the area of seat means exposed to the hydraulic fluid, a frusto conical face portion on said seat means adapted to seat on the poppet member in sealing relationship intermediate its width whereby a portion only of the face is exposed to fluid in the inner chamber in the closed position, said face sloping from the inner chamber toward the wall thereof in a direction adapted to cause a change in direction of fluid flow greater than 90° from the inner bore to the outer chamber and to expose the entire face area to fluid from the inner chamber when the seat means and shoulder are separated whereby to increase the force acting on the seat to separate the seat and shoulder and resilient means urging the seat means normally against the poppet member in sealing relationship therewith and the poppet member against the stop means.

2. A relief valve as claimed in claim 1 wherein said poppet means is provided with an annular shoulder portion at the end opposite the flange, said shoulder portion engaging the frusto conical face of the seat means intermediate its ends in a substantially line contact.

3. A relief valve comprising a housing having a cylindrical bore having an annularly reduced portion adjacent one end forming an inner bore, an outer chamber surrounding said bore adjacent one end of the annular reduced portion and separated by a dividing wall, said dividing wall having openings therethrough communicating between the bore and said chamber adjacent one end of the inner bore, an inlet in said bore communicating with a source of hydraulic fluid under pressure adjacent the end of the inner bore opposite said openings, a hollow cylindrical poppet member in the inner bore movable through the inner bore, said poppet member having an outwardly extending flange engaging the bore wall and adapted for limited movement between the end of the inner bore and the inlet in the bore, stop means in the bore adjacent the inlet spaced from the inner bore acting to limit the movement of the poppet flange, seat means movable in the inner bore across the openings in the wall thereof, said seat means having a hollow cylindrical member having a central bore, a closure diaphragm extending across the central bore adjacent the frusto conical face having an orifice therethrough communicating with said central bore and the source of hydraulic pressure and piston means in said central bore in the end opposite the diaphragm over which said seat means is adapted to move, said piston means and diaphragm forming a damping chamber to restrain vibration of the seat, a frusto conical face portion on said seat means adapted to seat on the poppet member in sealing relationship intermediate its width whereby a portion only of the face is exposed to fluid in the inner chamber in the closed position, said face sloping from the inner chamber toward the wall thereof in a direction adapted to cause a change in direction of fluid flow greater than 90° from the inner bore to the outer chamber and to expose the entire face area to fluid from the inner chamber when the seat means and shoulder are separated whereby to increase the force acting on the seat to separate the seat and shoulder and resilient means urging the seat means normally against the poppet member in sealing relationship therewith and the poppet member against the stop means.

4. A relief valve comprising a housing having an inner bore, outlet means communicating with said bore intermediate the ends thereof, said inner bore communicating at one end with a source of hydraulic fluid under pressure, shoulder means in the inner bore adjacent the outlet means, seat means movable longitudinally in the inner bore, said seat means is a hollow cylindrical member having a central bore, a closure diaphragm extending across the central bore adjacent the frusto conical face having an orifice therethrough communicating with said central bore and the source of hydraulic pressure and piston means in said central bore in the end opposite the diaphragm over which said seat means is adapted to move, said piston means and diaphragm forming a damping chamber to restrain vibration of the seat said seat means having a face portion adapted to seat on the shoulder in sealing relationship intermediate its width whereby a portion only of the face is exposed to fluid in the inner chamber in the closed position, said face sloping from the inner bore toward the outlet means in a direction adapted to cause a change in direction of fluid flow greater than 90° from the inner bore to the outlet means and to expose the entire face area to fluid from the inner chamber when the seat means and shoulder are separated whereby to increase the force acting on the seat to separate the seat and shoulder.

References Cited in the file of this patent

UNITED STATES PATENTS

| | | |
|---|---|---|
| 254,130 | Harrison | Feb. 28, 1882 |
| 2,524,264 | Knox | Oct. 3, 1950 |
| 2,568,026 | Pigott | Sept. 18, 1951 |
| 2,591,528 | Filstrup | Apr. 1, 1952 |
| 2,655,173 | Overbeke | Oct. 13, 1953 |
| 2,839,078 | Lornitzo | June 17, 1958 |
| 2,917,072 | Saville | Dec. 15, 1959 |

FOREIGN PATENTS

| | | |
|---|---|---|
| 548,801 | Great Britain | Oct. 26, 1942 |
| 633,005 | Great Britain | Dec. 5, 1949 |
| 75,802 | Holland | Sept. 15, 1954 |